(12) United States Patent
Hu

(10) Patent No.: US 9,927,651 B2
(45) Date of Patent: Mar. 27, 2018

(54) DISPLAY DEVICE

(71) Applicant: Shenzhen China Star Optoelectronics Technology Co., Ltd., Shenzhen (CN)

(72) Inventor: Tao Hu, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 311 days.

(21) Appl. No.: 14/907,821

(22) PCT Filed: Dec. 30, 2015

(86) PCT No.: PCT/CN2015/099719
§ 371 (c)(1),
(2) Date: Jan. 27, 2016

(87) PCT Pub. No.: WO2017/096663
PCT Pub. Date: Jun. 15, 2017

(65) Prior Publication Data
US 2017/0293182 A1    Oct. 12, 2017

(30) Foreign Application Priority Data

Dec. 9, 2015 (CN) .......................... 2015 1 0909332

(51) Int. Cl.
G02F 1/136 (2006.01)
G02F 1/1335 (2006.01)
G02F 1/1368 (2006.01)

(52) U.S. Cl.
CPC ...... *G02F 1/133514* (2013.01); *G02F 1/1368* (2013.01); *G02F 1/133528* (2013.01);
(Continued)

(58) Field of Classification Search
CPC ............. G02F 1/133524; G02F 1/1323; G02F 11/133524; G02F 1/133615; G02B 6/0068
See application file for complete search history.

(56) References Cited

U.S. PATENT DOCUMENTS

2010/0091225 A1* 4/2010 Cho ....................... G02B 1/005
349/105

FOREIGN PATENT DOCUMENTS

CN        103278961 A      9/2013

\* cited by examiner

*Primary Examiner* — Phu Vu
(74) *Attorney, Agent, or Firm* — Leong C. Lei

(57) ABSTRACT

The present invention provides a display device, which includes a color filter, a quantum dot (QD)-injected photonic crystal film, and a backlight module. The QD-injected photonic crystal film is formed by injecting QDs into a photonic crystal film. Due to the light guiding effect of the photonic crystal, the light emission efficiency of the QDs can be effectively improved. The photonic crystal film includes red, green, and blue light transmission zones. The QDs injected into red, green, and blue light transmission zones of the photonic crystal film are respectively red, green, and blue QDs, so that when white mixed light emitting from the backlight source reaches the QD-injected photonic crystal film, light transmission zones of the photonic crystal film allow only light of corresponding colors to pass such that the QDs contained therein emit light of corresponding colors. Further, these colors of light respectively transmit through the color filters of corresponding colors. Light of other colors is reflected back by the photonic crystal film to be subjected to scattering and re-reflection by the optical film for being subsequently allowed to transmit through the other two light transmission zones of photonic crystal film.

15 Claims, 2 Drawing Sheets

(52) U.S. Cl.
CPC ........... *G02F 1/133617* (2013.01); *G02F 2001/133614* (2013.01); *G02F 2202/10* (2013.01); *G02F 2202/32* (2013.01); *G02F 2202/36* (2013.01); *G02F 2203/01* (2013.01)

DISPLAY DEVICE

BACKGROUND OF THE INVENTION

1. Field of the Invention

The present invention relates to the field of display technology, and in particular to a display device.

2. The Related Arts

Liquid crystal displays (LCDs) have a variety of advantages, such as thin device body, low power consumption, and being free of radiation, and are thus used widely. Most of the LCDs that are currently available in the market are back-lighting LCDs, which comprise a liquid crystal display panel and a backlight module. The liquid crystal display panel is generally composed of a color filter (CF) substrate, a thin-film transistor (TFT) substrate, liquid crystal interposed between the CF substrate and the TFT substrate, and sealant. The operation principle of the liquid crystal display panel is that with liquid crystal molecules interposed between two parallel glass substrates, electricity is applied to the glass substrates to control the orientation of the liquid crystal molecules in order to change the state of polarization of light from the backlight module. And, polarizers are arranged such that light is allowed to transmit or blocked in order to achieve displaying.

Quantum dots (QDs) are semiconductor crystal particles having a particle size between 1-100 nm. The particle sizes of QDs are relatively small, smaller than or close to the exciton Bohr radius, and may causes the quantum confinement effect so that the continuous energy band structure of the material may be converted into a separate energy band structure. Under the excitation of external energy, electrons may migrate and emit fluorescence. Such a unique energy band separation structure of the QDs make the full width at half maximum thereof relatively narrow and may thus emit monochromic light having improved purity, providing a higher light emission efficiency than the conventional display devices. Also, since the energy band gaps of the QDs is greatly affected by the size thereof, it is possible to adjust the size of the QDs or use different ingredients of the QDs to emit different wavelengths of light. To satisfy the need for wide gamut and high color saturation by people, inclusion of electroluminescent QDs in display panels is an effective solution for the major display manufacturers. The current mainstream solution is to combine a quantum dot device with backlighting by dispersing quantum dots in specific adhesives for bonding with a polarizer or a color filter, in order to make a new style of quantum dot displays. However, since the adhesives and the color filers have different indexes of refraction, refraction loss at the interface and the absorption of light of other colors by a monochromic color filter would greatly reduce the utilization of light, making the quantum dot light emission efficiency low and poor transmittal of the entire display device.

Photonic crystal (PC) is an artificial periodic dielectric structure having photonic band gap characteristics and is formed of a periodic arrangement of media of different indexes refraction, allowing for transmission of a specific wavelength through control of the structure so as to have other colors of light be reflected by the PC. Today, some manufacturers have started researches for applications of various structures of one-dimensional photonic crystal in the field of displays.

SUMMARY OF THE INVENTION

An object of the present invention is to provide a display device that comprises a photonic crystal film that is arranged to correspond to a color filter and comprises quantum dots injected therein so as to effectively increase light utilization and light emission efficiency of the quantum dots and provide an easy manufacturing process.

To achieve the above object, the present invention provides a display device, which comprises a color filter, a QD-injected photonic crystal film located below the color filter, a backlight module located below the QD-injected photonic crystal film, and an optical film located between the QD-injected photonic crystal film and the backlight module;

the color filter comprising a red filter, a green filter, and a blue filter;

the QD-injected photonic crystal film being formed of a photonic crystal film in which QDs are injected, the photonic crystal film comprising red, green, and blue light transmission zones respectively corresponding to the red, green, and blue filters of the color filter, the photonic crystal film being formed of a three-dimensional photonic crystal, the three-dimensional photonic crystal comprising periodically distributed three-dimensional pores;

the red, green, and blue light transmission zones of the photonic crystal film respectively allowing red, green, and blue light to transmit therethrough, wherein for the QD-injected photonic crystal film, the QDs that are injected into the red, green, and blue light transmission zones of the photonic crystal film are respectively red, green, and blue QDs.

The photonic crystal film is formed of an organic material, an inorganic material, or an organic/inorganic composite material.

The photonic crystal film is formed of a material comprising one of $TiO_2$, $Al_2O_3$, $ZrO_2$, $SiO_2$, $Y_2O_3$—$ZrO_2$, $CuO$, $Cu_2O$, $Tr_2O_5$, and monodisperse inverse opal.

The photonic crystal film of the QD-injected photonic crystal film is formed on the optical film by means of a photolithography etching process.

The QDs are selected from one or more of the following QDs, which are doped or non-doped: zinc sulfide, cadmium sulfide, zinc oxide, gallium nitride, gallium selenide, zinc selenide, cadmium selenide, zinc telluride, cadmium telluride, lead telluride, indium phosphide, and gallium arsenide.

The QDs are graphene QDs or carbon QDs.

Light emitting from the backlight module is white light.

The optical film comprises a brightness enhancement film having a prismatic structure.

The display device further comprises a first transparent substrate, a second transparent substrate located under the first transparent substrate, a liquid crystal layer arranged between the first and second transparent substrates, a TFT layer arranged on a surface of the second transparent substrate that is adjacent to the liquid crystal layer, an upper polarizer, and a lower polarizer.

The color filter is arranged on a surface of the first transparent substrate that is adjacent to the liquid crystal layer; the upper polarizer is arranged on a surface of the first transparent substrate that is distant from the liquid crystal layer; the lower polarizer is arranged on a surface of the second transparent substrate that is distant from the liquid crystal layer; and the QD-injected photonic crystal film is located below the lower polarizer.

The present invention also provides a display device, which comprises a color filter, a QD-injected photonic crystal film located below the color filter, a backlight module located below the QD-injected photonic crystal film, and an optical film located between the QD-injected photonic crystal film and the backlight module;

the color filter comprising a red filter, a green filter, and a blue filter;

the QD-injected photonic crystal film being formed of a photonic crystal film in which QDs are injected, the photonic crystal film comprising red, green, and blue light transmission zones respectively corresponding to the red, green, and blue filters of the color filter, the photonic crystal film being formed of a three-dimensional photonic crystal, the three-dimensional photonic crystal comprising periodically distributed three-dimensional pores;

the red, green, and blue light transmission zones of the photonic crystal film respectively allowing red, green, and blue light to transmit therethrough, wherein for the QD-injected photonic crystal film, the QDs that are injected into the red, green, and blue light transmission zones of the photonic crystal film are respectively red, green, and blue QDs;

wherein the photonic crystal film is formed of an organic material, an inorganic material, or an organic/inorganic composite material;

wherein the photonic crystal film is formed of a material comprising one of $TiO_2$, $Al_2O_3$, $ZrO_2$, $SiO_2$, $Y_2O_3$—$ZrO_2$, $CuO$, $Cu_2O$, $Tr_2O_5$, and monodisperse inverse opal;

wherein the photonic crystal film of the QD-injected photonic crystal film is formed on the optical film by means of a photolithography etching process;

wherein light emitting from the backlight module is white light; and wherein the optical film comprises a brightness enhancement film having a prismatic structure.

The efficacy of the present invention is that the present invention provides a display device, which comprises a color filter, a QD-injected photonic crystal film located below the color filter, and a backlight module. The QD-injected photonic crystal film is formed by injecting QDs into a photonic crystal film. Due to the light guiding effect of the photonic crystal, the light emission efficiency of the QDs can be effectively improved. The photonic crystal film comprises a red light transmission zone, a green light transmission zone, and a blue light transmission zone. The QDs injected into red, green, and blue light transmission zones of the photonic crystal film are respectively red, green, and blue QDs, so that when white mixed light emitting from the backlight source reaches the QD-injected photonic crystal film, light transmission zones of the photonic crystal film allow only light of corresponding colors to pass such that the QDs contained therein emit light of corresponding colors. Further, these colors of light respectively transmit through the color filters of corresponding colors. Light of other colors is not absorbed by the color filter and is instead reflected back by the photonic crystal film to be further subjected to scattering and re-reflection by the optical film for being subsequently allowed to transmit through the other two light transmission zones of photonic crystal film and further transmit through the color filter, thereby increasing the light transmittal and light utilization of the display device.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
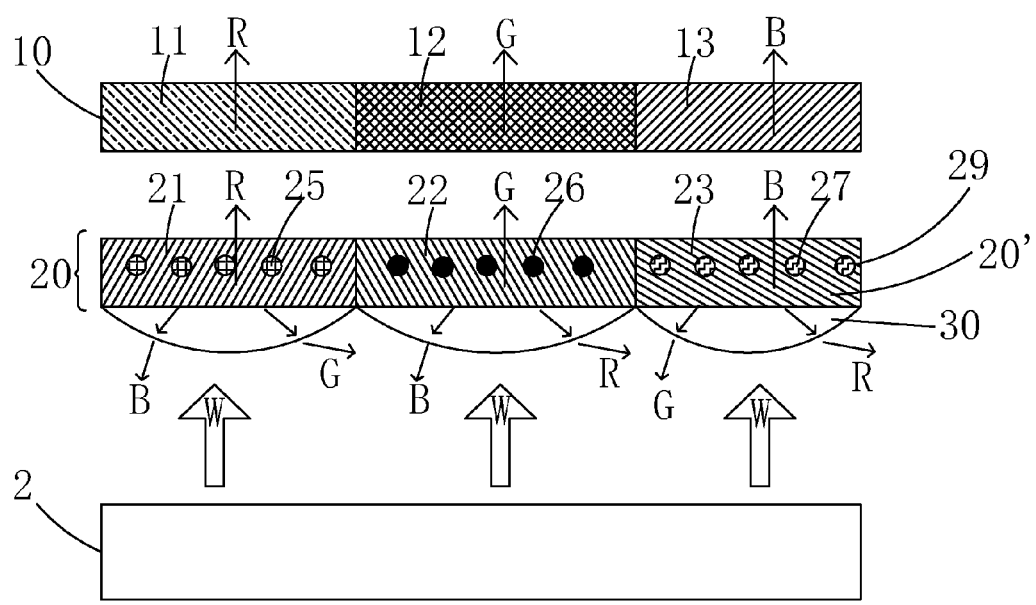
FIG. 1 is a schematic view illustrating light paths of a display device according to the present invention.
Figure 2:
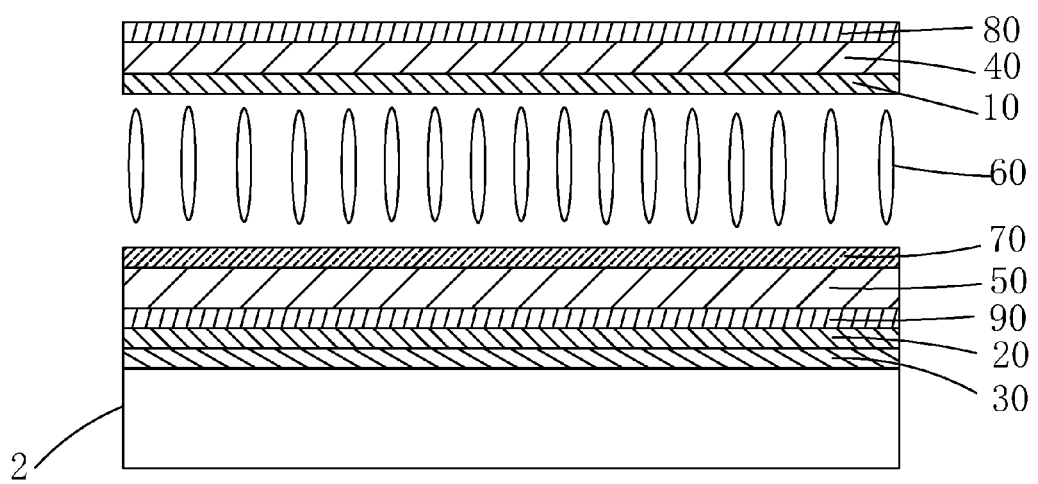
FIG. 2 is a schematic view illustrating a cross-sectional structure of a preferred embodiment of the display device according to the present invention.

Referring to FIGS. 1-2, the present invention provides a display device, which comprises a color filter 10, a quantum dot (QD)-injected photonic crystal film 20 located below the color filter 10, a backlight module 2 located below the QD-injected photonic crystal film 20, and an optical film 30 located between the QD-injected photonic crystal film 20 and the backlight module 2.

The color filter 10 comprises a red filter 11, a green filter 12, and a blue filter 13.

The QD-injected photonic crystal film 20 is formed by injecting ODs into a photonic crystal film 20'. The photonic crystal film 20' comprises red, green, and blue light transmission zones 21, 22, 23 respectively corresponding to the red, green, and blue filters 11, 12, 13 of the color filter 10. The photonic crystal film 20' is formed of a three-dimensional photonic crystal and the three-dimensional photonic crystal comprises periodically distributed three-dimensional pores 29.

The red, green, and blue light transmission zones 21, 22, 23 of the photonic crystal film 20' respectively allow red, green, and blue light to transmit therethrough. For the QD-injected photonic crystal film 20, the QDs that are injected into the red, green, and blue light transmission zones 21, 22, 23 of the photonic crystal film 20' are respectively red, green, and blue QDs 25, 26, 27.

Specifically, light emitting from the backlight module 2 is while light.

As shown in FIG. 1, when the white mixed light (W) emitting from the backlight module 2 reaches the QD-injected photonic crystal film 20, the red, green, and blue light transmission zones 21, 22, 23 of the photonic crystal film 20' allow the red (R), green (G), and blue (B) components respectively corresponding thereto to pass such that the red, green, and blue QDs 25, 26, 27 contained therein respectively emit out red, green, and blue light. Further, the red, green, and blue light respectively transmit through the red, green, and blue filters 11, 12, 13 of the color filter 10. Colors of light other than those corresponding to the red, green, and blue filters 11, 12, 13, however, are not absorbed and are instead reflected back by the photonic crystal film 20' of the QD-injected photonic crystal film 20, and, after being subjected to scattering and re-reflection by the optical film 30, are allowed to pass through the other two light transmission zones of the photonic crystal film 20' to then transmit through the color filter 10, thereby increasing light transmittal and light utilization of the display device. Further, due to light guidance effect of the photonic crystal, the light emission efficiency of the QDs can be effectively improved.

Specifically, the photonic crystal film 20' is made of a material comprising an organic material, an inorganic material, or an organic/inorganic composite material, such as TiO$_2$, Al$_2$O$_3$, ZrO$_2$, SiO$_2$, Y$_2$O$_3$—ZrO$_2$, CuO, Cu$_2$O, Tr$_2$O$_5$, and monodisperse colloid inverse opal.

Specifically, the photonic crystal film 20' of the QD-injected photonic crystal film 20 is formed on the optical film 30 by means of a photolithography etching process.

Specifically, the optical film 30 may comprise a brightness enhancement film (BEF) having a prismatic structure.

Specifically, the QDs o the QD-injected photonic crystal film 20 can be selected from one or more of the following QDs, which can be doped or non-doped: zinc sulfide, cadmium sulfide, zinc oxide, gallium nitride, gallium selenide, zinc selenide, cadmium selenide, zinc telluride, cadmium telluride, lead telluride, indium phosphide, and gallium arsenide; or can alternatively be other QDs, such as graphene QDs and carbon QDs.

Referring to FIG. 2, a preferred embodiment of the display device of the present invention is illustrated. Specifically, the display device further comprises a first transparent substrate 40, a second transparent substrate 50 located under the first transparent substrate 40, a liquid crystal layer 60 arranged between the first and second transparent substrates 40, 50, a thin-film transistor (TFT) layer 70 arranged on a surface of the second transparent substrate 50 that is adjacent to the liquid crystal layer 60, an upper polarizer 80, and a lower polarizer 90.

Specifically, the color filter 10 is arranged on a surface of the first transparent substrate 40 that is adjacent to the liquid crystal layer 60; the upper polarizer 80 is arranged on a surface of the first transparent substrate 40 that is distant from the liquid crystal layer 60; the lower polarizer 90 is arranged on a surface of the second transparent substrate 50 that is distant from the liquid crystal layer 60; and the QD-injected photonic crystal film 20 is located below the lower polarizer 90.

In addition, since the photonic crystal film 20' of the QD-injected photonic crystal film 20 is a transparent material, it can be arranged between various films/layers of the display device to form, correspondingly, multiple various types of structure or configuration.

In summary, the present invention provides a display device, which comprises a color filter, a QD-injected photonic crystal film located below the color filter, and a backlight module. The QD-injected photonic crystal film is formed by injecting QDs into a photonic crystal film. Due to the light guiding effect of the photonic crystal, the light emission efficiency of the QDs can be effectively improved. The photonic crystal film comprises a red light transmission zone, a green light transmission zone, and a blue light transmission zone. The QDs injected into red, green, and blue light transmission zones of the photonic crystal film are respectively red, green, and blue QDs, so that when white mixed light emitting from the backlight source reaches the QD-injected photonic crystal film, light transmission zones of the photonic crystal film allow only light of corresponding colors to pass such that the QDs contained therein emit light of corresponding colors. Further, these colors of light respectively transmit through the color filters of corresponding colors. Light of other colors is not absorbed by the color filter and is instead reflected back by the photonic crystal film to be further subjected to scattering and re-reflection by the optical film for being subsequently allowed to transmit through the other two light transmission zones of photonic crystal film and further transmit through the color filter, thereby increasing the light transmittal and light utilization of the display device.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A display device, comprising a color filter, a quantum dot (QD)-injected photonic crystal film located below the color filter, a backlight module located below the QD-injected photonic crystal film, and an optical film located between the QD-injected photonic crystal film and the backlight module;
   the color filter comprising a red filter, a green filter, and a blue filter;
   the QD-injected photonic crystal film being formed of a photonic crystal film in which QDs are injected, the photonic crystal film comprising red, green, and blue light transmission zones respectively corresponding to the red, green, and blue filters of the color filter, the photonic crystal film being formed of a three-dimensional photonic crystal, the three-dimensional photonic crystal comprising periodically distributed three-dimensional pores;
   the red, green, and blue light transmission zones of the photonic crystal film respectively allowing red, green, and blue light to transmit therethrough, wherein for the QD-injected photonic crystal film, the QDs that are injected into the red, green, and blue light transmission zones of the photonic crystal film are respectively red, green, and blue QDs.

2. The display device as claimed in claim 1, wherein the photonic crystal film is formed of an organic material, an inorganic material, or an organic/inorganic composite material.

3. The display device as claimed in claim 2, wherein the photonic crystal film is formed of a material comprising one of TiO$_2$, Al$_2$O$_3$, ZrO$_2$, SiO$_2$, Y$_2$O$_3$—ZrO$_2$, CuO, Cu$_2$O, Tr$_2$O$_5$, and monodisperse inverse opal.

4. The display device as claimed in claim 1, wherein the photonic crystal film of the QD-injected photonic crystal film is formed on the optical film by means of a photolithography etching process.

5. The display device as claimed in claim 1, wherein the QDs are selected from one or more of the following QDs, which are doped or non-doped: zinc sulfide, cadmium sulfide, zinc oxide, gallium nitride, gallium selenide, zinc selenide, cadmium selenide, zinc telluride, cadmium telluride, lead telluride, indium phosphide, and gallium arsenide.

6. The display device as claimed in claim 1, wherein the QDs are graphene QDs or carbon QDs.

7. The display device as claimed in claim 1, wherein light emitting from the backlight module is white light.

8. The display device as claimed in claim 1, wherein the optical film comprises a brightness enhancement film having a prismatic structure.

9. The display device as claimed in claim 1 further comprising a first transparent substrate, a second transparent substrate located under the first transparent substrate, a liquid crystal layer arranged between the first and second transparent substrates, a thin-film transistor (TFT) layer arranged on a surface of the second transparent substrate that is adjacent to the liquid crystal layer, an upper polarizer, and a lower polarizer.

10. The display device as claimed in claim 9, wherein the color filter is arranged on a surface of the first transparent substrate that is adjacent to the liquid crystal layer; the upper polarizer is arranged on a surface of the first transparent substrate that is distant from the liquid crystal layer; the lower polarizer is arranged on a surface of the second transparent substrate that is distant from the liquid crystal layer; and the QD-injected photonic crystal film is located below the lower polarizer.

11. A display device, comprising a color filter, a quantum dot (QD)-injected photonic crystal film located below the color filter, a backlight module located below the QD-injected photonic crystal film, and an optical film located between the QD-injected photonic crystal film and the backlight module;

the color filter comprising a red filter, a green filter, and a blue filter;

the QD-injected photonic crystal film being formed of a photonic crystal film in which QDs are injected, the photonic crystal film comprising red, green, and blue light transmission zones respectively corresponding to the red, green, and blue filters of the color filter, the photonic crystal film being formed of a three-dimensional photonic crystal, the three-dimensional photonic crystal comprising periodically distributed three-dimensional pores;

the red, green, and blue light transmission zones of the photonic crystal film respectively allowing red, green, and blue light to transmit therethrough, wherein for the QD-injected photonic crystal film, the QDs that are injected into the red, green, and blue light transmission zones of the photonic crystal film are respectively red, green, and blue QDs;

wherein the photonic crystal film is formed of an organic material, an inorganic material, or an organic/inorganic composite material;

wherein the photonic crystal film is formed of a material comprising one of $TiO_2$, $Al_2O_3$, $ZrO_2$, $SiO_2$, $Y_2O_3$—$ZrO_2$, $CuO$, $Cu_2O$, $Tr_2O_5$, and monodisperse inverse opal;

wherein the photonic crystal film of the QD-injected photonic crystal film is formed on the optical film by means of a photolithography etching process;

wherein light emitting from the backlight module is white light; and wherein the optical film comprises a brightness enhancement film having a prismatic structure.

12. The display device as claimed in claim 11, wherein the QDs are selected from one or more of the following QDs, which are doped or non-doped: zinc sulfide, cadmium sulfide, zinc oxide, gallium nitride, gallium selenide, zinc selenide, cadmium selenide, zinc telluride, cadmium telluride, lead telluride, indium phosphide, and gallium arsenide.

13. The display device as claimed in claim 11, wherein the QDs are graphene QDs or carbon QDs.

14. The display device as claimed in claim 11 further comprising a first transparent substrate, a second transparent substrate located under the first transparent substrate, a liquid crystal layer arranged between the first and second transparent substrates, a thin-film transistor (TFT) layer arranged on a surface of the second transparent substrate that is adjacent to the liquid crystal layer, an upper polarizer, and a lower polarizer.

15. The display device as claimed in claim 14, wherein the color filter is arranged on a surface of the first transparent substrate that is adjacent to the liquid crystal layer; the upper polarizer is arranged on a surface of the first transparent substrate that is distant from the liquid crystal layer; the lower polarizer is arranged on a surface of the second transparent substrate that is distant from the liquid crystal layer; and the QD-injected photonic crystal film is located below the lower polarizer.

* * * * *